United States Patent [19]
Rasmussen et al.

[11] Patent Number: 5,808,904
[45] Date of Patent: Sep. 15, 1998

[54] CONTINUOUS DUTY TIE ROD PRESS STRAIN MONITOR

[75] Inventors: Steven F. Rasmussen, Lyndhurst; Robert F. Rasmussen, South Euclid; Steven G. Belovich, Hinckley, all of Ohio

[73] Assignee: Angstrom Corporation, Euclid, Ohio

[21] Appl. No.: 744,981

[22] Filed: Nov. 7, 1996

[51] Int. Cl.$^6$ .................................................. G01B 7/16
[52] U.S. Cl. .................. 364/528; 364/550; 364/551.01; 364/551.02; 73/862.542; 73/862.625; 324/207.18; 340/870.36
[58] Field of Search .............................. 364/508, 551.01, 364/551.02, 550; 100/214, 257, 258, 259; 73/862.542, 562.625, 862.541, 862.625; 324/207.18; 340/870.36

[56] References Cited

U.S. PATENT DOCUMENTS

| | | |
|---|---|---|
| 2,672,950 | 3/1954 | Leiman . |
| 3,411,345 | 11/1968 | Wintriss ........................................ 73/88 |
| 3,598,149 | 8/1971 | Witkin ...................................... 137/599 |
| 3,948,088 | 4/1976 | Sheperd ..................................... 73/760 |
| 3,957,469 | 5/1976 | Nebash ................................... 73/863.22 |
| 4,195,563 | 4/1980 | Budraitis et al. ........................... 100/99 |
| 4,260,346 | 4/1981 | Anderson, Jr. et al. .................... 425/78 |
| 4,274,282 | 6/1981 | Budraitis et al. ..................... 73/862.625 |
| 4,280,363 | 7/1981 | Johansson ................................. 73/768 |
| 4,305,299 | 12/1981 | Serata ....................................... 73/779 |
| 4,312,241 | 1/1982 | Budraitis et al. ..................... 73/862.325 |
| 4,335,439 | 6/1982 | St. Denis ................................ 364/562 |
| 4,383,449 | 5/1983 | Mickowski ............................... 73/764 |
| 4,412,456 | 11/1983 | Wilhelm et al. ..................... 73/862.541 |
| 4,429,579 | 2/1984 | Wilhelm .................................. 73/768 |
| 4,493,362 | 1/1985 | Moore et al. ........................... 164/457 |
| 4,507,132 | 3/1985 | Yoshida .................................... 96/139 |
| 4,526,044 | 7/1985 | Moser et al. ........................... 73/862.06 |
| 4,554,534 | 11/1985 | Jones ...................................... 340/665 |
| 4,558,756 | 12/1985 | Seed ....................................... 177/211 |
| 4,633,720 | 1/1987 | Dybel et al. ........................... 73/862.53 |
| 4,671,124 | 6/1987 | Seliga .................................... 73/862.53 |
| 4,750,131 | 6/1988 | Martinez .............................. 364/862.53 |
| 4,766,758 | 8/1988 | Lucas et al. ......................... 73/862.045 |

(List continued on next page.)

FOREIGN PATENT DOCUMENTS

| | | | |
|---|---|---|---|
| 1172798 | 6/1964 | Germany ................................. 55/320 |
| 1329801 | 8/1987 | U.S.S.R. ................................. 55/320 |
| 3661 | 9/1912 | United Kingdom ..................... 55/332 |

*Primary Examiner*—Emanuel Todd Voeltz
*Assistant Examiner*—Demetra R. Smith
*Attorney, Agent, or Firm*—Benesch, Friedlander, Coplan & Aronoff LLP

[57] ABSTRACT

An apparatus (20) for press operation data acquisition comprises a tie rod (45a) for bearing a load during a press cycle. The rod (45a) has a load bearing portion (76) and a non-load bearing portion (78). An elongated, axially extending bore (75) is formed in one end (62) of the rod (45a) such that the bore (75) extends from the non-load bearing portion (78) into the load bearing portion (76). A linear variable differential transformer (LVDT) (24), includes a core portion (114) movably disposed relative to a coil portion (118), such that magnetic flux generated by current impression on the coil portion (118) is influenced by a position of the core portion (114) relative thereto. The core portion (114) is secured to a shaft (80). The shaft (80) is adapted for axial movement within the bore (75) in response to deformation of the rod (45a) during press operation. The coil portion (118) is adapted to receive an electric signal current from an associated electric source. The magnetic flux induced by operation of the associated press is regularly sensed by monitoring of the electric signal in a sensing coil portion (120). A position signal is periodically generated (126) that is representative of a relative position of the core portion (114) to the coil portion (118) in accordance with sensed magnetic flux. The apparatus is adapted for automatically calibrating the position signal (304, 306) to a base level prior to initiating a press cycle of the associated press. A press deflection signal is generated (320, 322) in accordance with the position signal.

17 Claims, 5 Drawing Sheets

U.S. PATENT DOCUMENTS

| | | | |
|---|---|---|---|
| 4,866,429 | 9/1989 | Granere | 340/680 |
| 5,066,911 | 11/1991 | Hulsing, II | 324/207.18 |
| 5,119,311 | 6/1992 | Gold et al. | 364/476.01 |
| 5,142,769 | 9/1992 | Gold et al. | 29/621.1 |
| 5,214,967 | 6/1993 | Grogan | 73/862.542 |
| 5,285,722 | 2/1994 | Schockman | 100/53 |
| 5,402,689 | 4/1995 | Grogan | 73/862.635 |
| 5,440,499 | 8/1995 | Rasmussen | 364/551.01 |
| 5,491,647 | 2/1996 | O'Brien et al. | 364/551.02 |
| 5,609,099 | 3/1997 | Burns et al. | 100/257 |

CONTINUOUS DUTY TIE ROD PRESS STRAIN MONITOR

TECHNICAL FIELD

The present invention is directed to monitoring loads in a forging press and is particularly directed to a method and apparatus for continuous, real time monitoring of loads in steel tie rod load bearing members of forging presses and the like. However, it will be appreciated that the invention has broader applications such as in any system in which stress or strain characteristics in tie rod load bearing rod members are advantageously measured or monitored continuously, accurately, and in real time.

BACKGROUND OF THE INVENTION

In the manufacture of articles formed through forging, punching, stamping or press operations it is desirable to measure the force applied to a workpiece or load in a press during a press cycle. Insufficient force applied to a workpiece results in underformed or malformed workpieces. Excessive force may also result in malformed workpieces or damage to the press and associated dies. Furthermore, excessive force may be indicative that the press is being operated beyond its designed capabilities.

There are two basic types of press frames used in the forging industry. The first type of press frame has four solid cast steel load bearing members at the four corners of the die bed. In this type of press, the forged frame members are the primary load bearing elements in the press. The second type of press frame has cast steel tie rods that extend through the press frame. The tie rods are typically located at the corners of the die bed. The tie rods are the load bearing elements in the second type of press frame. The press frame may be one cast piece, similar to the first type of press, or may have a plurality of cast steel frame members, e.g. three cast steel members. The three cast steel members are a base, an intermediate frame portion, and a cap or crown section. In presses having a plurality of frame members, the tie rods are the load bearing members and hold the plurality of frame members together.

Some tie rod presses pre-tension the tie rods to pre stress the load bearing members. The tie rods are heated after being placed in position within the press frame. While the tie rods are hot, the tie rod nut is tightened. Once the tie rods cool, the frame members are pre compressed.

U.S. Pat. No. 5,440,499 to Rasmussen discloses an apparatus for monitoring press operations in a press having the first type of frame, i.e. solid cast steel frame for the load bearing members. The press monitoring apparatus is mounted on the cast steel frame. However, in a press having tie rods for the load bearing elements, measuring the strain in the cast steel components does not reflect the true strain in the press during a press cycle. Therefore, in a press frame having tie rods for the load bearing elements, it is desirable to measure the forces in the load bearing elements, i.e., the tie rods.

SUMMARY OF THE INVENTION

The present invention contemplates a new and improved press monitor which provides continuous, real time and non-supervised monitoring and control of a press apparatus for a press having tie rods as the load bearing elements.

A press operation data acquisition apparatus in accordance with the present invention comprises a rod for bearing a load during a press cycle. The rod has a load bearing portion and a non-load bearing portion. An elongated, axially extending bore is formed in one end of the rod such that the bore extends from the non-load bearing portion into the load bearing portion of the rod. The apparatus has a linear variable differential transformer ("LVDT"). The LVDT includes a core portion movably disposed relative to a coil portion such that magnetic flux generated by current impression on the coil portion is influenced by a position of the core portion relative thereto. The core portion is secured to the rod with one end of a shaft. The shaft is adapted for axial movement within the bore in response to deformation of the rod during press operation. The coil portion receives an electric current from an associated current source. The apparatus regularly senses the magnetic flux induced by operation of the associated press by monitoring of voltage in the coil portion. A transducer assembly is included for periodically generating a position signal representative of a relative position of the core portion to the coil portion in accordance with sensed magnetic flux. A controller is adapted for automatically calibrating the position signal to a base level prior to completing a press cycle of the associated press. The controller generates a press deflection signal in accordance with the position signal.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
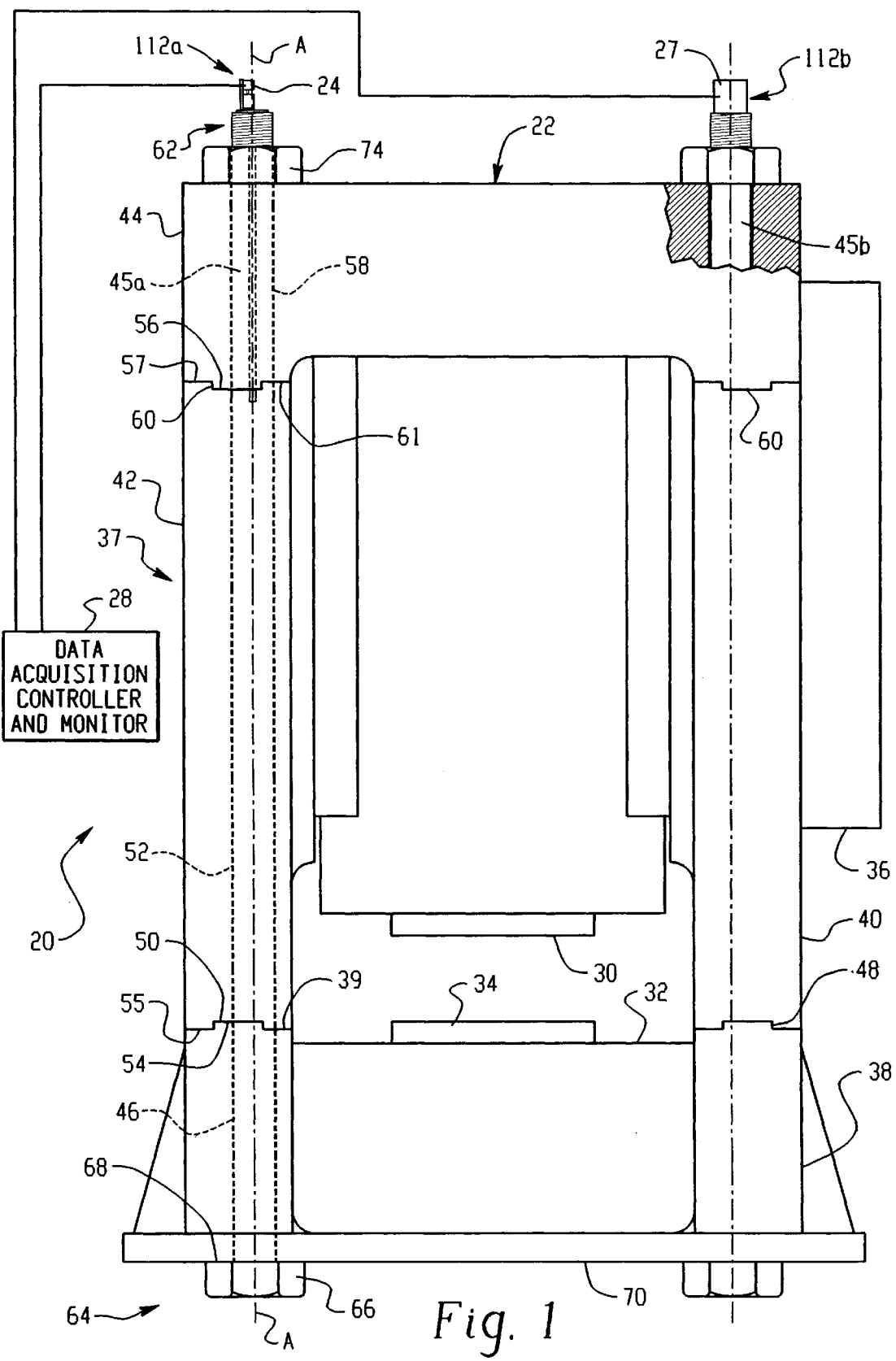
FIG. 1 illustrates a press machine and controller/monitor in accordance with the present invention.
Figure 4:
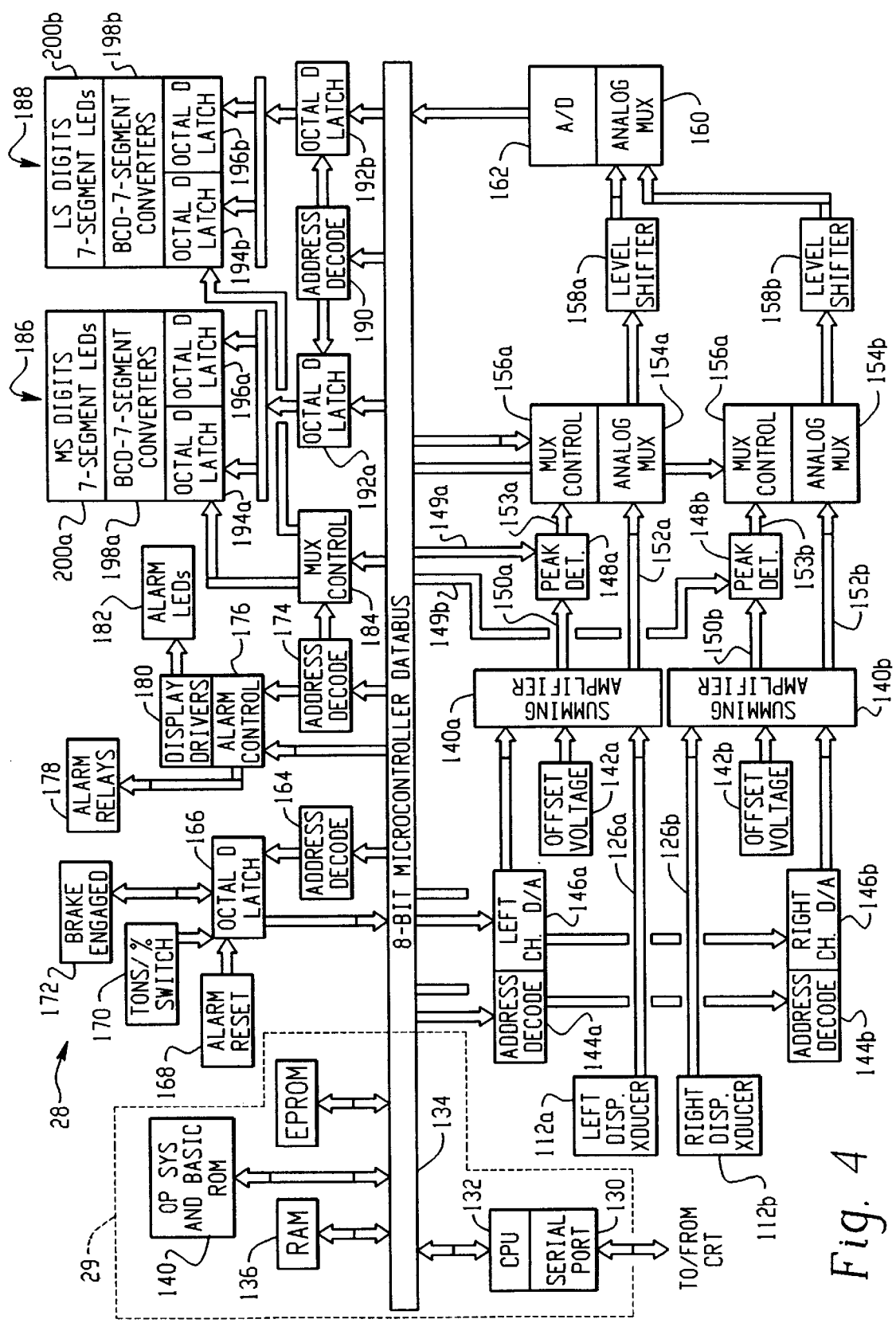
FIG. 4 illustrates a block diagram of the data acquisition controller/monitor shown in FIG. 1.

Referring to FIG. 1, an apparatus 20 includes a press 22, linear variable differential transformer ("LVDT") mechanisms 24 and 26, and a data acquisition controller/monitor 28. In the preferred embodiment, the data acquisition controller/monitor 28 includes a microcontroller 29 (FIG. 4).

The press 22 includes a ram 30 disposed adjacent to a platen 32. A workpiece 34 to be formed is placed on the platen 12. A die or tooling (not shown) for forming the workpiece is operatively attached to the ram 30 and/or the platen 32. The press 22 is a motor driven system employing a motor/gear arrangement 36 to drive the ram 30. A brake (not shown) is selectively engaged with the motor/gear arrangement 36 to inhibit operation of the ram 30. The brake is equipped with a sensor (not shown) that provides a signal to the data acquisition controller 28 indicative of whether the brake is engaged. One skilled in the art will appreciate that the ram 30 may be driven by other suitable drives such as a hydraulic drive ram.

The press 22 includes a frame 37 that has a base 38, intermediate sections 40, 42, a cap section 44 and tie rods 45a, 45b. The frame 37, operatively links the ram 30 with the platen 32. It will be appreciated that operation of the press 22 results in an induced stress or strain in the tie rods 45a, 45b, i.e. the load bearing members of the press 22. The base 38 is generally rectangular and has a cylindrical bore 46 extending through the base from bottom to top, as viewed in FIG. 1. The bore 46 has an associated vertical generally central longitudinal axis A. Each of the four corners of the base 38 has a corresponding bore and axis (only one being shown for clarity in the illustration). The bore openings in the base are adapted to receive the tie rods 45a, 45b. It is to be understood a that each corner of the base has an associated bore opening for an associated tie rod. The base 38 has a rectangular ridge 48 extending along the top surface 39 of the base 38 from front to rear as viewed in FIG. 1. A rectangular ridge 50 extends along the top surface 39 of the base 38 from front to rear as viewed in FIG. 1.

The intermediate section 42 has a cylindrical bore 52 extending through the intermediate section from bottom to top, as viewed in FIG. 1. The bore 52 has an associated vertical generally central longitudinal axis that lies on axis A. A corresponding bore (not shown) is similarly located over the associated bore opening at the rear corner of the base. The bore openings are adapted to receive the tie rods. A rectangular channel 54 extends along the bottom surface 55 of the intermediate section 42 from front to rear as viewed in FIG. 1. The channel 54 is adapted to receive the ridge 50 of the base 38. The intermediate section 42 has a rectangular channel 56 extending along the top surface 57 from front to rear as viewed in FIG. 1. The structure of intermediate section 40 is similar to that of intermediate section 42. It will be appreciated that each intermediate section 40, 42 has two bore openings. Each bore opening is associated with a corresponding tie rod located at the corners of the base 38.

The cap section 44 has a cylindrical bore opening 58 extending through the cap section 44 from bottom to top, as viewed in FIG. 1. The bore 58 has an associated vertical generally central longitudinal axis that lies on axis A. The bore opening 58 is adapted to receive the tie rod 45a. Additional bore openings (not shown) are similarly located at the remaining corners of the cap section 44 over associated bore openings in a respective intermediate section 40, 42 and the base 38. The cap section 44 has a rectangular ridge 60 extending along the bottom surface 61 of the cap section 44 from front to rear as viewed in FIG. 1. A rectangular ridge 62 extends along the bottom surface of the cap section 44 from front to rear as viewed in FIG. 1. The ridge 60 is adapted to engage the channel 56 in the intermediate section 42. The intermediate section 40 similarly engages the ridge 62 of the cap section 44.

The tie rod 45a has opposed first and second spaced apart ends 62 and 64. The end 64 has a forged head 66 such that when the tie rod 45a is inserted through the bore opening 46 in the base 38, a surface 68 of the head 66 overlaps and engages the bottom surface 70 of the base 38. It will be appreciated that the head 66 of the tie rod 45a may also be recessed and countersunk in an appropriately shaped opening in the bottom of the base 38. The other end 62 of the tie rod 45a has a threaded portion 72 for receiving a tie rod nut 74.

Figure 2:
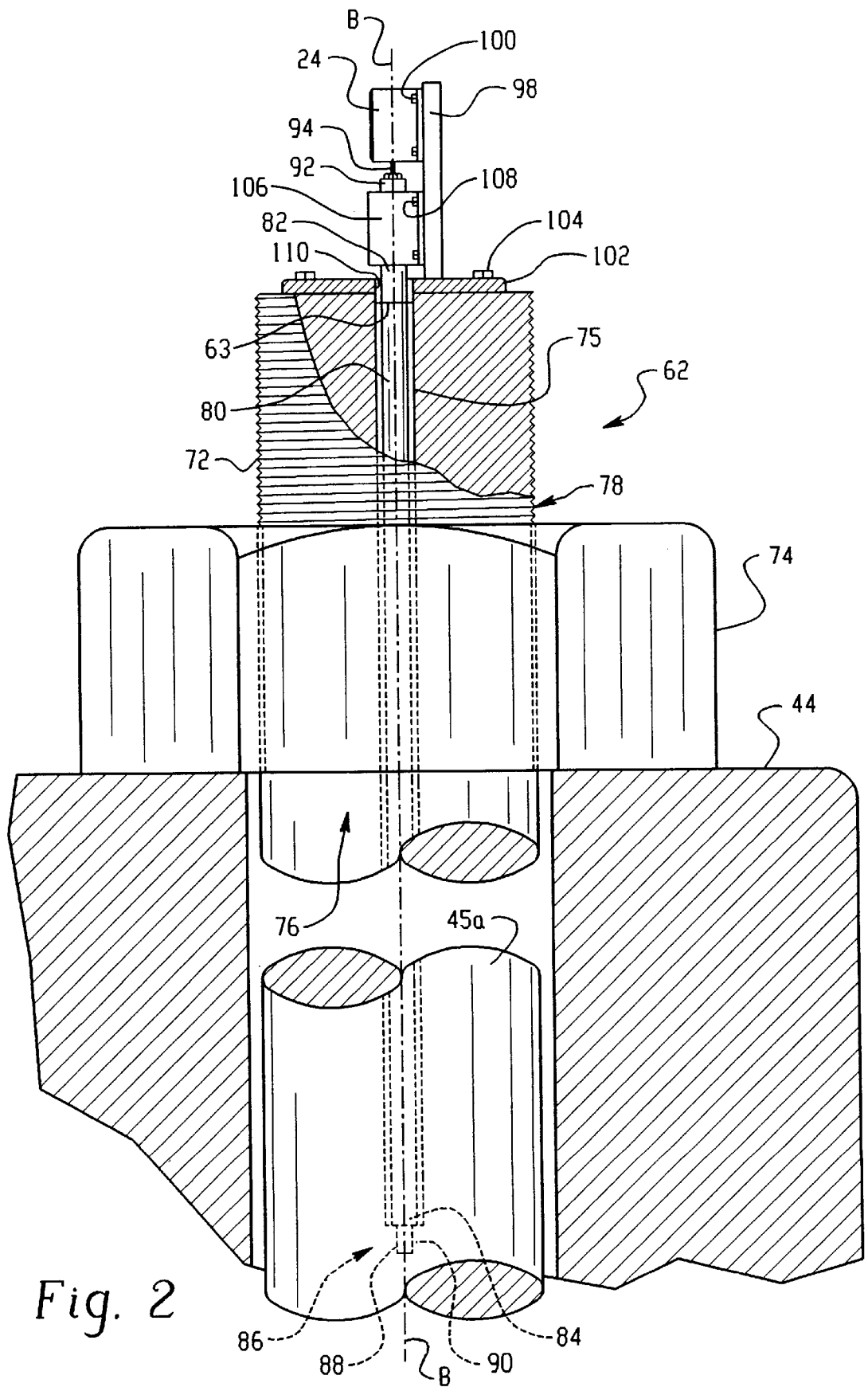
FIG. 2 shows a partial cut away side view of a tie rod and a LVDT assembly as utilized in accordance present invention of FIG. 1.

Referring to FIG. 2, the tie rod 45a has a cylindrical bore opening 75 extending longitudinally into the tie rod 45a from the end 62. An enclosed end 86 has a cylindrical bore opening 88 co-axial with the longitudinal axis B. The diameter of the bore opening 75 is greater than the diameter of the bore opening 88. Preferably, the longitudinal bore opening 75 extends four feet into the tie rod 45a from the tie rod end 62. The remaining tie rods are similarly structured and are therefore not described in further detail herein. It will be appreciated by one skilled in the art, that upon press operation the tie rod 45a has (i) a load bearing section 76 located below the tie rod nut 74, as viewed in FIG. 1, and (ii) a non-load bearing section 78 located above the tie rod nut 74, as viewed in FIG. 1.

Referring again to FIG. 2, the LVDT mechanism 24 is shown in accordance with a preferred embodiment of the present invention. The LVDT mechanism includes an elongated shaft 80 having opposed first and second spaced apart ends 82 and 84. The shaft 80 is suitably formed of a relatively inflexible material, such as hardened steel. The shaft 80 has a longitudinal axis B and has a diameter such that it is adapted for longitudinal movement within the bore opening 75. The end 84 has a threaded portion 90 which is adapted to be received in the cylindrical tapped co-axial bore opening 88 in the end 86 of the bore opening 75. The threaded portion 90 has a diameter that is less than the diameter of the shaft 80. The end 82 of the shaft 80 has a bolt mechanism 92 that is secured coaxially to the shaft 80 at the end 82. The bolt mechanism 92 is, in turn, operatively connected to an extension shaft 94 that is a moveable portion of the linear variable differential transformer 24 (LVDT). A suitable LVDT is manufactured by Lucas Schaevitz of Pennsauken, N.J. The LVDT 24 is secured to a support arm 98 using suitable fasteners 100. A suitable oil is placed in the bore opening 75 filling the bore opening to a level 63. The oil dampens vibrations of the Shaft 80 caused by operation of the press. The oil prevents a temperature difference from developing between the shaft 80 and the tie rod 45a.

The support arm 98 is suitably fastened to a base flange 102. The base flange 102 is mounted with appropriate fasteners 104 on the non-load bearing section 78 of the tie rod 45a. A linear bearing 106 is mounted on the support arm 98 below the LVDT 24, as viewed in FIG. 2. The threaded portion 90 of the shaft 80 is fixedly attached to the tapped extension 88 in the enclosed end 86 of the bore 75. The shaft 80 extends from the load bearing section 76 of the tie rod 46a out of the non-load bearing portion 78. The shaft 80 passes through an opening 110 in the flange 102 and through the linear bearing 106. into operative connection with the extension shaft 94 of the LVDT 24. With this arrangement, the LVDT 24 and the shaft 80 are operatively coupled on the axis B and are adapted to generate an electrical signal indicative of longitudinal stresses and strains in the tie rod 45a during press operation. The LVDT 26 is encased with a protective housing 27 (FIG. 1).

Figure 3:
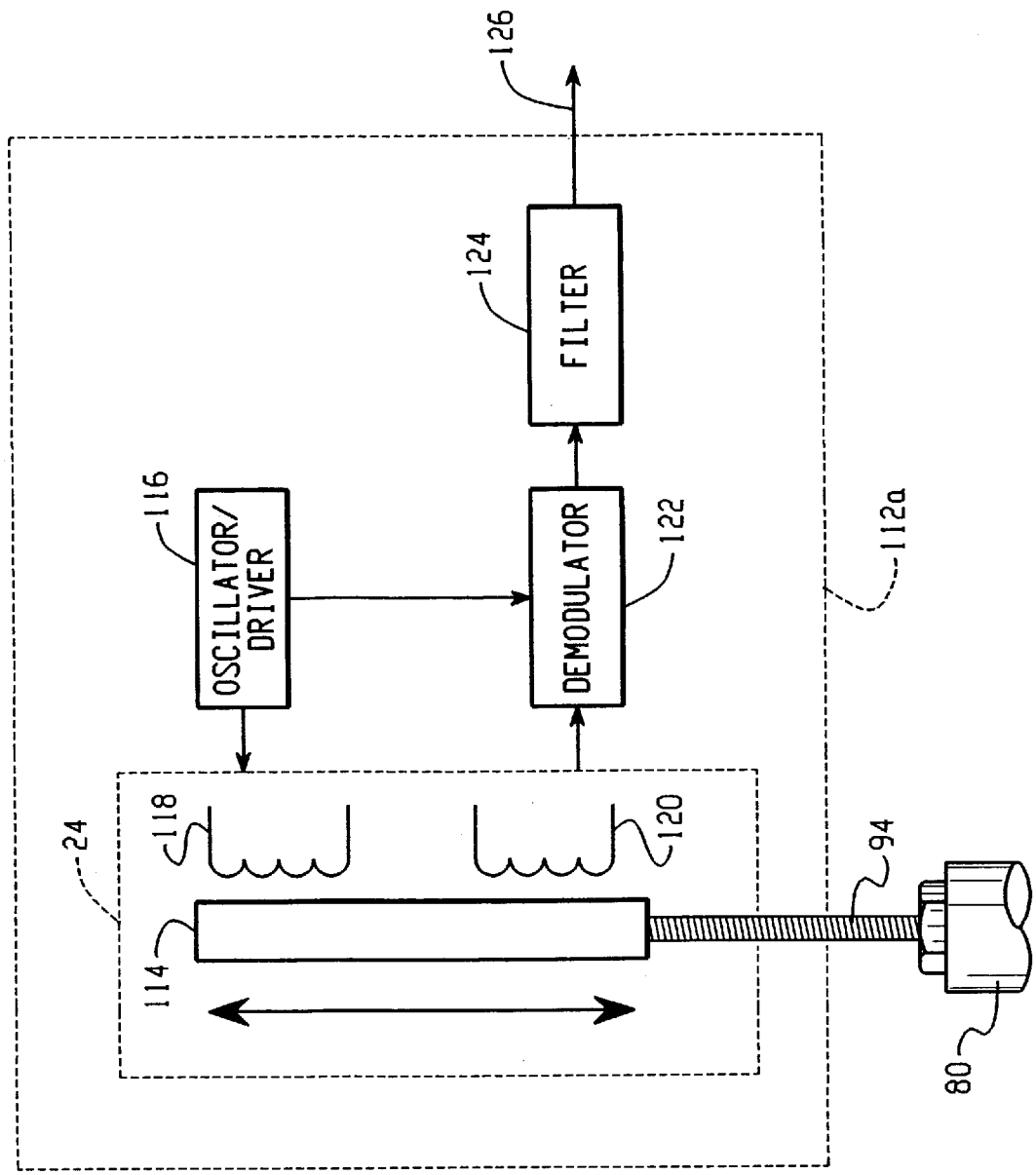
FIG. 3 illustrates a block diagram of a displacement transducer assembly using a linear variable differential transformer.

Referring now to FIG. 3, a displacement transducer assembly 112a, which includes the LVDT 24, will be better appreciated. A second transducer assembly 112b is similar to transducer assembly 112a and is therefore not described in further detail herein. The LVDT 24 includes a core 114 which is coaxially secured to the extension shaft 94 described above. An oscillator/driver 116 imparts a voltage to a coil 118, thereby inducing a magnetic flux therefrom. The core 114 is ferrous and disposed physically approximate to the coil 118. Accordingly, flux generated by application of current from the oscillator/driver 116 is affected by the relative position of the core 114 thereto. A sensor coil 120 of the LVDT 24 acquires information as to properties of the flux, and provides an electrical signal from voltages induced therefrom to a demodulator 122. The analog signal from the demodulator 122 is communicated to a filter 124. The filtered signal is provided to the data acquisition controller/monitor 28 on a line 126.

Referring to FIG. 4, the data acquisition controller and monitor 28 will be better understood. The controller/monitor 28 includes the microcontroller 29. The microcontroller 29 has a serial port 130 for input/output communications with an appropriate device, e.g. an interactive CRT or a keypad for manual data entry, as well as an external display is also advantageously employed to provide an indication as to monitored press characteristics outside of the actual controller area. The serial port 130 is electrically connected to a CPU 132 which is operatively connected to a microcontroller databus 134. The microcontroller 29 includes a RAM 136, an EPROM 138, and ROM 140.

The preferred embodiment illustrates two displacement transducer assemblies 112a, 112b, each assembly representing an input channel to the controller/monitor 28. Since the channels are similar, only one channel is described in detail herein. The output 126a of transducer assembly 112a is in data communication with a summing amplifier 140a. The summing amplifier 140a further receive input signals from an offset voltage 142a. The offset voltage 142a allows for additional control and stabilizing of the signal from the transducer 112a. The microcontroller 29 is in data communication with the summing amplifier 140a via the databus 134 which is in data communication with (i) an address decoder 144a, and (ii) a D/A converter 146a.

An output 150a of the summing amplifier 140a is electrically connected to a peak detector 148a. The peak detector 148a is in data communication with the microcontroller 29 through the databus 134 and a line 149a. An output 152a of the summing amplifier 140a is in data communication with an analog multiplexer (hereinafter "MUX") 154a. The output 152a is provided for (i) testing and debugging the channel, and (ii) direct measurement of the summing amplifier output 150a without processing through the peak detector 148a. The peak detector 148a communicates through an output line 153a with a MUX control 156a that is in data communication with the microcontroller 29 via the databus 134. The analog MUX 154a is used to select which signal, from output 152a or 153a, is communicated to a level shifter 158a. The level shifter 158a provides an electrical signal to an analog MUX 160. The level shifter 158a adjusts the value of the output from the analog MUX 154a to be compatible with the input range of the analog MUX 160. The analog MUX 160 selectively provides a signal from one of the level shifters 158a, 158b to an A/D converter 162. The AID converter 162 provides the selected signal to the microcontroller 29 via data communication connection to the databus 134. The A/D converter 162 serves to digitize the selected signal for communication to the microcontroller 29. Once the first signal is digitized, the analog MUX 160 selects a remaining signal, which has yet to be digitized, to be provided to the AID converter 162. The analog MUX 160 continues to select signals to be provided to the A/D convertor 162 until all of the transducer signals have been processed.

The microcontroller 29 provides a digital signal to the D/A converter 146a which, in turn, provides an analog signal to the summer 140a. The summer 140a sums the signals received from the transducer 112a and D/A converter 146a to form a composite signal therewith. With this arrangement, it will be appreciated that a feedback loop is provided for enhancing stability and accuracy of the system as determined by the microcontroller 29. It will also be appreciated that the offset voltage 142a is provided for the purpose of maintaining the signal within an optimized signal range to the peak detector 148a.

Referring to FIG. 4, the microcontroller 29 is in data communication with an address decoder 164. The address decode 164 is in data communication with a latch, an octal D latch 166, in the preferred embodiment. An alarm reset 168 is in data communication with latch 166 for inputting an alarm reset signal to the microcontroller 29. A tons/% switch 170 provides a signal indicative of a desired output format for the press strain data, i.e. tons of applied force or percentage of machine capacity applied. A press brake engaged sensor 172 provides a signal indicative of whether the press brake (not shown) is engaged. The octal D latch 166 selectively provides a signal from reset 168, switch 170, and sensor 172 to the microcontroller 29 in response to a control signal from the address decode 164 as directed by the microcontroller 29.

The microcontroller 29 is in date communication with (i) an address decode 174, and (ii) an alarm control 176. The alarm control 176 is in data communication with the alarm relays 178. The alarm relays 178 suitably actuate alarm devices (not shown) such as audio alarms and flashing alarms. Alternatively, they can be used to initiate operation of any external device, such as a safety mechanism, etc. The alarm control 176 is further controllably connected to display drivers 180. The display drivers 180 are operatively connected to alarm LED's 182 for actuating the alarm LED's 182.

The address decode 174 is in data communication with a MUX control 184. The MUX control 184 is in electrical communication with the microcontroller 29 via the databus 134. The MUX control 184 is electrically connected to a display assembly 186 and a display assembly 188. The display assemblies 186, 188 have a common address decode 190 that is controllably connected to the microcontroller 29 with the databus 134. The display assemblies 186 and 188 are similar and thus, only one will be described in detail herein. The address decode 190 is operatively connected to a octal D latches 192a and 192b. The octal D latch 192a communicates with an octal D latch 194a and an octal D latch 196a. The latches 194a, 196a are electrically connected to BCD-7-Segment converters 198a for usual output in the preferred embodiment. However, it will be appreciated that any suitable output may be used. The converters 198a are electrically connected to MS Digits 7-segment LED's 200a for displaying a value indicative of stress measured during press operation.

Figure 5:
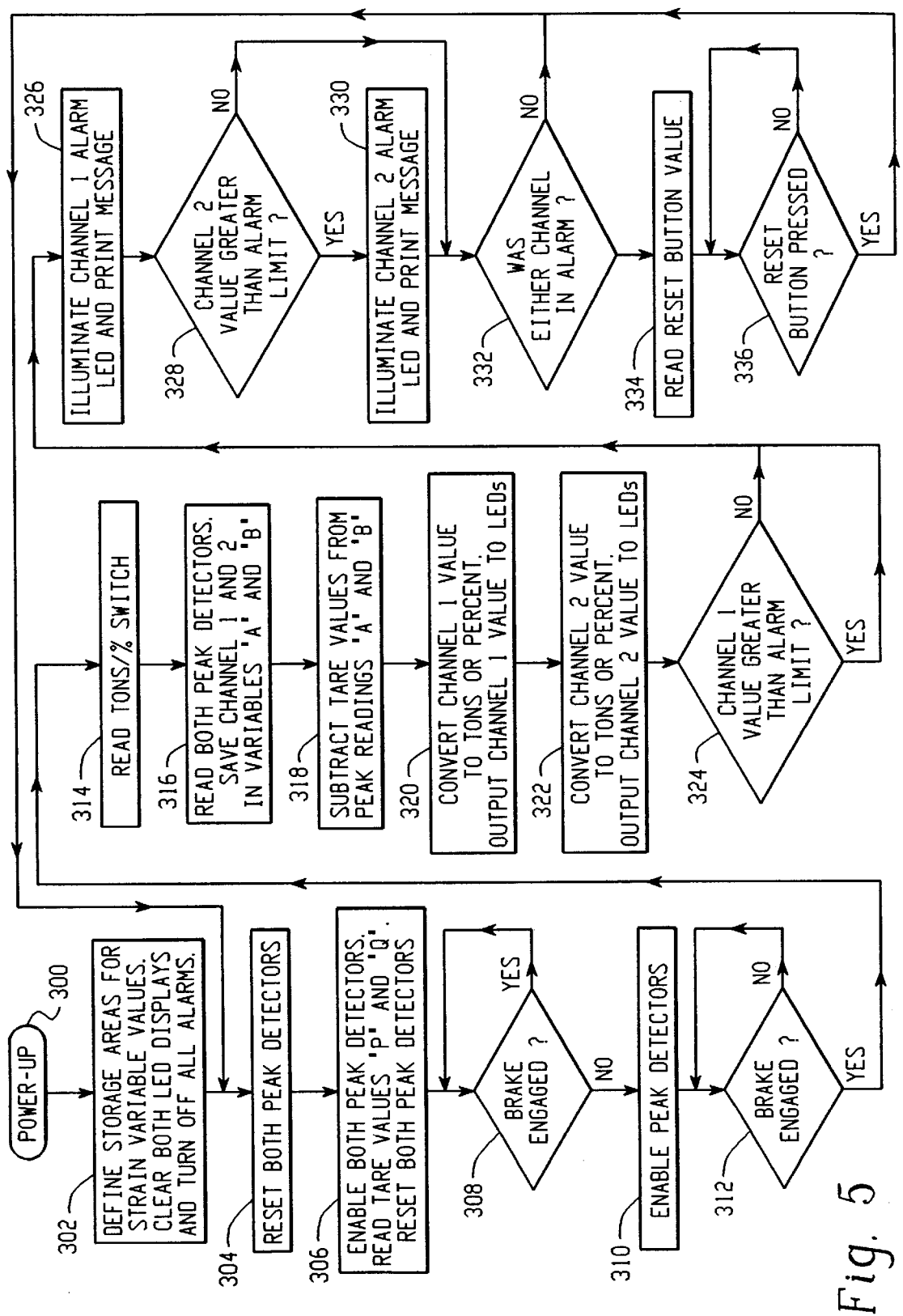
FIG. 5 is a flow chart illustrating the control process followed by the controller/monitor shown in FIG. 1.

Referring to FIG. 5, the control process of the data acquisition controller/monitor 28 of the present invention will be better appreciated. The control process for continuous press monitoring begins at step 300 in which the microcontroller 29 powers up and self diagnostics of the microcontroller are performed, timers reset, memories are cleared, etc., as is well known in the art. In step 302, storage areas are reserved in memory to store values used to determine adjusted peak values of strain measurements from the displacement transducer assemblies 112a, 112b. The adjusted peak values are used (i) to determine whether an alarm condition exists, and (ii) as values, indicative of the peak strain measured during a press operation shown on the display assemblies 186, 188, or stored for future reference. Both of the LED display assemblies 186, 188 are cleared and the alarm control 176 turns off all alarms i.e., the alarm relays 178, and alarm LED's 182. Next, in step 304, the microcontroller 29 resets the peak detectors 148a, 148b by providing a signal on the lines 149a, 149b to internal analog chip that clears the charge of a capacitor (not shown). The capacitors are internal to the peak detectors 148a, 148b and are used as a storage device indicative of the previous peak value. Discharging the capacitor removes any residual charge remaining on the capacitor that may erroneously bias the next strain gauge peak value.

In step 306, the peak detectors 148a, 148b are enabled and the tare values for the LVDT's 24, 26 are read and stored as variables P and Q in memory. The tare values are the values read by the displacement transducer assemblies 112a, 112b with the press 22 at rest. The tare values P and Q are used to calibrate the transducer assemblies 112a, 112b prior to each press operation. The peak detectors 148a, 148b are reset again and the process proceeds to step 308 where a determination is made as to whether the press brake (not shown) is engaged. If the determination is affirmative, the process loops back to step 308. If the determination in step 308 is negative, indicating that the brake is not engaged and a press operation is about to occur, the process proceeds to step 310. In step 310, the peak detectors 148a, 148b are again enabled and the analog MUXes 154a, 154b, 160 are set to route the peak data from the displacement transducers 112a, 112b to the A/D converter 162, as determined by the microcontroller.

In step 312, a determination is made as to whether the brake is engaged. If the determination is negative, indicating that a next press operation has yet to occur, the process loops back to step 312. If the determination in step 312 is affirmative, indicating that a press operation is completed and the brake is again engaged, the process continues to step 314. In step 314, the microcontroller 29 reads the selected position of the tons/% switch 170. When the operator selects tons the peak values output by the microcontroller 29 to the display assemblies 186, 188 will be in units of tons. When the switch 170 is set on the % setting, the peak values are displayed in percentage of press operating capacity, e.g. 110% of design capacity.

Next, in step 316, the peak detectors 148a, 148b for each channel are read and the peak values are provided to the A/D converter 162. The digitized values are provided to the microcontroller 29 for storage in memory as variables A and B. In step 318, the tare values P and Q are subtracted from the respective sensed peak readings A and B to provide adjusted peak values for channel one and channel two. After the adjusted peak values are determined in step 318, the process proceeds to step 320. In step 320, the adjusted peak value determined in step 318 for channel one is converted in the microcontroller 29 to a tons units value or a percentage of press capacity units value, in response to the selection made in step 314. In step 322, the adjusted peak value determined in step 318 for channel two is converted in the microcontroller to a tons units value or a percentage of press capacity units value, depending upon the selection made in step 314.

In step 324, a determination is made as to whether the adjusted peak value of channel one is greater than a predetermined threshold value corresponding to channel one. If the determination is negative, the process proceeds to step 328. If the determination is affirmative, indicating that the adjusted peak value of channel one is greater than the predetermined threshold value, the process proceeds to step 326. In step 326, the microcontroller 29 provides a control signal to the alarm control 176 which (i) actuates the alarm relays 178, (ii) actuates the alarm display drivers 180 which, in turn, actuate the alarm LED's 182, and (iii) provides an output signal through the serial port 130 to the CRT or a printer (not shown) to display and record the adjusted peak value for channel one. The process proceeds to step 328, where a determination is made as to whether the adjusted peak value of channel two is greater than a different predetermined threshold. If the determination is negative, the process proceeds to step 332. If the determination is affirmative, indicating that the adjusted peak value of channel two is greater than its predetermined threshold value, the process proceeds to step 330. In step 330, the microcontroller 29 provides a control signal to the alarm control 176 which (i) actuates the appropriate alarm relays 178 for channel two, (ii) actuates the alarm display drivers 180 for channel two which, in turn, actuate the channel two alarm LED's 182, and (iii) provides an output signal through the serial port 130 to the CRT or a printer (not shown) to display and record the peak value of channel two.

In step 332, a determination is made as to whether the adjusted peak value of either channel one or channel two are greater than their respective threshold value. If the determination is negative, the process returns to step 304. If the determination in step 332 is affirmative, indicating that the adjusted peak value of at least one of the two channels is greater than its respective threshold value, the process proceeds to step 334. In step 334, the microcontroller 29 reads the current reset button value. Next, in step 336, a determination is made as to whether the alarm reset button 168 has been actuated by the press operator. If the determination is affirmative, the process returns to step 304. If the determination in step 336 is negative, indicating that the press operator has not reset the alarm button 168, the process loops back to step 336. It is to be understood that the control process described above is repeated continuously during the entire time period that the system of the present invention is powered up.

One skilled in the art will appreciate that the present invention is applicable to presses having a single piece cast frame that use tie rods for the load bearing members, e.g. pre-tensioned tie rod presses. Furthermore, the press strain monitor is adaptable for use in other machines that use tie rods for load bearing members during operation, e.g. upsetters and rolling mills.

With the above described structure and operation, it will be appreciated that the present invention provides a means for acquiring and providing continuous, reliable press operation data during press operation. It is to be further appreciated that the acquired press operation data is tested during press operation to provide warning signals indicative of press operation exceeding predetermined threshold values in real time. Thus, the present invention is useful in identifying undesirable press operating characteristics during a production run. The undesirable operating characteristics may result in flawed production of workpieces and damage to press components and dies.

With the foregoing construction, there is provided a press operation monitoring apparatus which allows for continuous real time monitoring of press operations, or the like. The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A press operation data acquisition device comprising:
   a rod for bearing a load during a press cycle, said rod having a load bearing portion and a non-load bearing portion;
   an elongated, axially extending bore formed in one end of said rod such that said bore extends from said non-load bearing portion into said load bearing portion;
   a linear variable differential transformer, including a core portion movably disposed relative to a coil portion, such that magnetic flux generated by current impression on said coil portion is influenced by a position of said core portion relative thereto;

securing means for securing said core portion to said rod, said securing means moving axially within said bore in response to deformation of said rod during press operation;

said coil portion including means for receiving a signal from an associated electric source;

sensing means for regularly sensing the magnetic flux induced by operation of the associated press by monitoring of an electric signal in said coil portion;

position signal generating means for periodically generating a position signal representative of a relative position of said core portion to said coil portion in accordance with sensed magnetic flux;

calibrating means for automatically calibrating the position signal to a base level prior to initiating a press cycle of the associated press; and means for generating a press deflection signal in accordance with said position signal.

2. The press operation data acquisition apparatus of claim 1 wherein said rod is a tie rod for joining a plurality of associated press components.

3. The press operation data acquisition apparatus of claim 2 wherein said plurality of associated press components are assembled into a press frame.

4. The press operation data acquisition apparatus of claim 1 wherein said coil portion is mounted on said non-load bearing portion of said rod.

5. The press operation data acquisition apparatus of claim 1 further comprising means for generating a display signal in accordance with said press deflection signal.

6. The press operation data acquisition apparatus of claim 1 further comprising means for storing said press deflection signal.

7. The press operation data acquisition apparatus of claim 1 further comprising means for comparing said position signal to a threshold value and providing an electrical signal indicative of said comparison.

8. A press operation data acquisition device comprising:

a rod for bearing a load during a press cycle, said rod expanding and compressing during said press cycle;

an elongated, axially extending bore formed in one end of said rod;

a linear variable differential transformer including, a core portion movably disposed relative to a coil portion, such that magnetic flux generated by voltage impression on said coil portion is influenced by a position of said core portion relative thereto;

securing means for securing said core portion to said rod, said securing means moving axially within said bore in response to deformation of said rod during press operation;

said coil portion including means for receiving an electric signal from an associated electric source;

sensing means for regularly sensing the magnetic flux induced by operation of the associated press by monitoring of an electric signal in said coil portion position signal generating means for periodically generating a position signal representative of a relative position of said core portion to said coil portion in accordance with sensed magnetic flux;

calibrating means for automatically calibrating the position signal to a base level prior to initiating a press cycle of the associated press; and means for generating a press deflection signal in accordance with said position signal.

9. The press operation data acquisition apparatus of claim 8 wherein said rod is a tie rod for joining a plurality of press components.

10. The press operation data acquisition apparatus of claim 9 wherein said plurality of press components are assembled into a press frame.

11. The press operation data acquisition apparatus of claim 8 further comprising means for generating a display signal in accordance with said press deflection signal.

12. The press operation data acquisition apparatus of claim 8 further comprising means for recording said press deflection signal.

13. The press operation data acquisition apparatus of claim 8 further comprising means for comparing said position signal to a threshold value and providing an electrical signal indicative of said comparison.

14. A method for monitoring the operation of a press comprising the steps of:

actuating said press for performing a pressing operation;

monitoring deformation of a load bearing rod relative to opposed first and second spaced apart ends of a shaft, said first end of the shaft securely mounted to said rod in a bore formed therein, said second end being operatively connected to a core portion of a linear variable differential transformer, said core portion being moveable relative to a coil portion of said linear variable differential transformer, said linear variable differential transformer providing a press deflection signal in response to axial movement of said shaft in said bore during a pressing operation;

automatically calibrating said press deflection signal to a base level prior to the step of actuating said press; and generating a display signal in accordance with said press deflection signal.

15. The method of claim 14 further comprising the step of generating a historic record of the rod deformation in accordance with the press deflection signal.

16. The method of claim 15 further including the steps of:

comparing the press deflection signal to a threshold value; and selectively generating an alarm signal in accordance with a result of the step of comparing.

17. The method of claim 16 further comprising the step of providing a second different press deflection signal in response to axial movement of a second different shaft; and providing a different threshold value for the step of comparing the second press deflection signal.

* * * * *